(12) United States Patent
Englund et al.

(10) Patent No.: US 9,393,618 B2
(45) Date of Patent: Jul. 19, 2016

(54) SINTERED BODY AND METHOD OF PRODUCING A SINTERED BODY

(71) Applicant: SANDVIK INTELLECTUAL PROPERTY AB, Sandviken (SE)

(72) Inventors: Sven Englund, Uppsala (SE); Jose Garcia, Enskededalen (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 251 days.

(21) Appl. No.: 14/322,977

(22) Filed: Jul. 3, 2014

(65) Prior Publication Data

US 2015/0010423 A1    Jan. 8, 2015

(30) Foreign Application Priority Data

Jul. 3, 2013    (EP) ..................................... 13174953

(51) Int. Cl.
    *B22F 3/10*      (2006.01)
    *C22C 29/06*     (2006.01)
    *B23B 27/14*     (2006.01)

(52) U.S. Cl.
    CPC ................ *B22F 3/1007* (2013.01); *B22F 3/10* (2013.01); *B22F 3/1025* (2013.01); *B22F 3/1028* (2013.01); *B23B 27/148* (2013.01); *C22C 29/06* (2013.01); *B22F 3/101* (2013.01); *B22F 2003/1042* (2013.01); *B22F 2302/10* (2013.01); *B23B 2222/16* (2013.01); *B23B 2222/28* (2013.01); *B23B 2228/24* (2013.01)

(58) Field of Classification Search
    CPC ................................. B22F 3/1007; B22F 3/10
    USPC ........................................................... 419/57
    See application file for complete search history.

(56) References Cited

U.S. PATENT DOCUMENTS

| | | |
|---|---|---|
| 5,993,970 A | 11/1999 | Oscarsson |
| 6,468,680 B1 | 10/2002 | Waldenstroem |
| 2005/0224958 A1 | 10/2005 | Kassel |
| 2006/0174976 A1 | 8/2006 | Mori |
| 2011/0008199 A1 | 1/2011 | Karlsson |

FOREIGN PATENT DOCUMENTS

WO    9802395 A1    1/1998

OTHER PUBLICATIONS

Schatt et al: "Pulvermetallurgie, Technologien und Werkstoffe, 2. bearbeitete und erweiterte Auflage" Dec. 31, 2007, Springer Verlag, pp. 181-181.
Anonymous:"Three Zones Tube Furnace "4") 13 with Vacuum Pump (1.0E-5 torr) + 9 Channel Digital Gas Flow-meters for CVD OTF-122X-4-III-9HV", Apr. 10, 2014, URL:http://www.mtixtl.com/threezonestubefurnacevacuumpump9channelgasflowmeteroff-1200x-4-iii-9hv.aspx.
Anonymous: "Carbon tube vacuum sintering 13 furnace", 3014-04-10, pp. 1-2, URL:http://www.lab-kits.com/sintering_muffle_furnace.

*Primary Examiner* — Weiping Zhu
(74) *Attorney, Agent, or Firm* — Corinne R. Gorski

(57) ABSTRACT

The present disclosure relates to a method of making a sintered cutting body having a side with binder metal capping and another side without binder metal capping. The disclosure also relates to a sintered cutting body produced according to the method.

15 Claims, 7 Drawing Sheets

SINTERED BODY AND METHOD OF PRODUCING A SINTERED BODY

RELATED APPLICATION DATA

This application claims priority under 35 U.S.C. §119 to EP Patent Application No 13174953.3, filed on Jul. 3, 2013, which the entirety thereof is incorporated herein by reference.

TECHNICAL FIELD

The present disclosure relates to a method of producing a sintered body having one side with binder metal capping and another side without binder metal capping. The disclosure also relates to the produced sintered cutting body.

BACKGROUND

There have been difficulties when making sintered bodies in the past, in particular sintered bodies for cutting used for providing cutting edges for various machining and cutting purposes. In general, sintered bodies for cutting are made of a cermet or a cemented carbide with a binder phase comprising cobalt. When sintering the body comprising cobalt the cobalt sometimes tends to rise to the surface of the body during the sintering process, creating a surface layer comprising a higher amount of cobalt than further towards the middle of the body for cutting.

It is not desired for all applications to have a higher amount of cobalt at the surface of a body for cutting. The surface cobalt may lower the adhesion abilities for further coating layers, such as CVD layers, added to the surface. Also for cutting bodies not using any further layers, the surface cobalt can be a disadvantage, since chips formed during machining of an object can be welded to the cobalt and thereby cause wear problems. When producing sintered bodies for cutting there is a desire for the sintered bodies to have a surface that has the ability to release the chips from the surface of the sintered bodies. Previously these cutting bodies after sintering have been machined by grinding or by blasting to remove the layer of cobalt.

For other applications the surface cobalt is advantageous, in particular if the cutting surfaces should be welded or brazed to for example saw blades. If the sintering process gives cutting bodies without surface cobalt these bodies needs treatment in order to achieve the desired welding or brazing properties. For this reasons it is highly desirable to be able to control the sintering process in order to either achieve surface cobalt or not achieve surface cobalt.

And thus for further applications it is desirable to be able to control the surface of the same body in order to have cobalt on a predetermined surface and no cobalt on another surface of a body after sintering.

SUMMARY

In order to solve the above problems, the present method of producing a sintered cutting body includes the steps of: providing a body of cermet or cemented carbide comprising carbon and binder metal; providing a sintering device for sintering of the body; sintering the body in a sintering process by means of the sintering device; providing the sintering process with a time range A, being a heating time range where temperature T at a certain moment in time t is either constant or raising; providing a subsequent cooling time range B of the sintering process where temperature T in range B is arranged at a certain moment in time t to be constant or decreasing; providing an atmosphere comprising at least one inert gas at a pressure P, at least during a first part range B1 of the range B in order to provide decarburizing conditions, wherein the pressure P in the sintering device during time range B1 fulfils the condition 100 Pa≤P≤15000 Pa, preferably 500 Pa≤P≤1500 Pa, wherein at least during a time range B2, subsequent to time range B1, the partial pressure of the binder metal is maintained higher for a side or part of a side and wherein the other part of the side or other sides of the body has/have a lower partial pressure for binder metal, such that binder metal is evaporated, thus providing a side or part of a side with binder metal capping, and the other part of a side or other sides with essentially no binder metal capping directly after having performed the method.

The effect of this method is that by controlling the partial pressure for the binder metal the produced sintered body can have its properties controlled. This means that the surface layer of chosen sides or surfaces of the sintered body can have a content of binder metal, i.e. binder metal capping that is different from another side or surface on the sintered body. This also has the effect that the achieved sintered body can be directly applied to its different uses without any extensive after-treatment. A further effect is that the production is simplified.

The binder metal can be cobalt, nickel, iron, tungsten, titanium, tantalum, niobium, chromium or any combinations thereof. In one embodiment the binder metal is cobalt. In another embodiment the binder metal consists of cobalt, or cobalt and nickel, or cobalt, nickel and iron.

The body of cermet or cemented carbide can be carbon, and the carbon can be in the form of free carbon, in solid solution in the binder metal or in the form of for example a carbide or carbonitride.

In a further development of the method the desired higher partial pressure for binder metal is achieved by contacting a side or part of a side of the body with a tray, thus achieving a sintered body provided with a side or part of a side, comprising a surface layer constituted of binder metal, wherein the other sides or part of side of the body, that have not been in contact with a tray, have been subjected to a low partial pressure of binder metal and thus are essentially free of binder-metal-capping.

An advantage with this is that the reduced partial pressure of binder metal is relatively easy to achieve. There is no need for extra arrangements, for example, to add gaseous binder metal or the like.

In one embodiment, at least two sides of the body are provided with binder metal capping while the other sides are essentially not.

In another embodiment of the present disclosure the two sides provided with binder metal capping are flat.

In yet another embodiment of the present disclosure the tray is provided with ridges such that when a body rests on the tray, two sides of the body are in contact with the surface of the tray.

In still another embodiment of the present disclosure the different partial pressures of binder metal during time range B2 is achieved by decreasing the pressure in the sintering device to a value below the pressure during time range B1.

In one embodiment of the present disclosure, wherein during time range B2, P fulfils the condition 0.01 Pa≤P≤70 Pa, preferably 0.1 Pa≤P≤50 Pa. The pressure P relates to the total pressure in the sintering device. The total pressure can be a sum of several partial pressures in the sintering device, and the partial pressure for the binder metal is in B2 such that the binder metal is evaporated, i.e. below the evaporation pressure for the binder metal at the specific temperature.

In one embodiment of the present disclosure the time range B2 is started when the temperature T has decreased below a solidification temperature of the binder metal.

In another embodiment of the present disclosure the time range B2 is started when the temperature T has decreased about 10 degrees below a solidification temperature of the binder metal.

In a further embodiment of the present disclosure the binder metal comprises cobalt. In a further development of the method the Co-capping layer is constituted of cobalt. This provides for particular good ability to use methods of welding of this surface.

In one embodiment of the present disclosure the atmosphere comprises argon during the time range B1.

In another embodiment of the present disclosure the atmosphere comprises argon and one or both of carbon monoxide and nitrogen during the time range B1.

In one embodiment of the present disclosure the low partial pressure of binder metal is provided in the sintering device by providing a coupling to the sintering device for connection to a vacuum pump. The sintering pump can be used to adjust the pressure P in the sintering device. The pump can further be used to hold the pressure at a constant level during the cooling time range B2, when the binder metal evaporates and thereby otherwise would increase the pressure in the sintering device. The pump can be run during B2 for example with a constant flow of argon through the sintering device.

In a further development of the method, the sintering temperature $T_S$ is in the range 1400° C.$\leq T_S \leq$1500° C. $T_S$ in this temperature range has proven to be particularly advantageous for sintering, particularly if the binder metal comprises cobalt. In a further development of the method the sintering temperature is in the range 1430° C.$\leq T_S \leq$1480° C. $T_S$ within this temperature range has been proven to be particularly suitable for achieving a dense, non-brittle and hard sintered product.

The present disclosure also relates to a sintered cutting body produced according to the method, and a tray for receiving a body to be sintered in accordance with the disclosure.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Herein being described with reference to the accompanying drawings, the method of the present disclosure is used to produce a sintered body 1, as shown in FIGS. 1-4. The sintered body 1 can be made of a cermet or cemented carbide. The method involves the steps of producing a sintered body under particular conditions, which alters the distribution of binder metal within the sintered body and specifically at the outer surface of the body. As disclosed in FIG. 1, the sintered body 1 is exemplified by an insert, used for example in milling cutters. It should be understood that the distribution of binder metal on the surface of the body can be altered by either providing binder metal on the surface or providing a surface that is essentially free of binder metal.

The method involves providing the body 1 to be sintered. The body 1 can be cemented carbide or a cermet and should, as known to one having ordinary skill in the art, include a binder metal and carbon.

The body 1 should preferably have at least one, or even more preferably, at least two essentially flat surfaces. However, the method is applicable for all shapes of bodies to be sintered, but if at least two flat surfaces are present on the body the method is particularly advantageous.

The method is also applicable when it is desired to achieve a side of a sintered body side having binder-metal-capping on part of the side, and no binder-metal-capping on the other part of the side. This could be achievable by lowering the partial pressure for only part of a side of a body to be sintered. As a body shrinks during sintering the means for applying partial pressure must adapt to the shrinking body.

Figure 6:
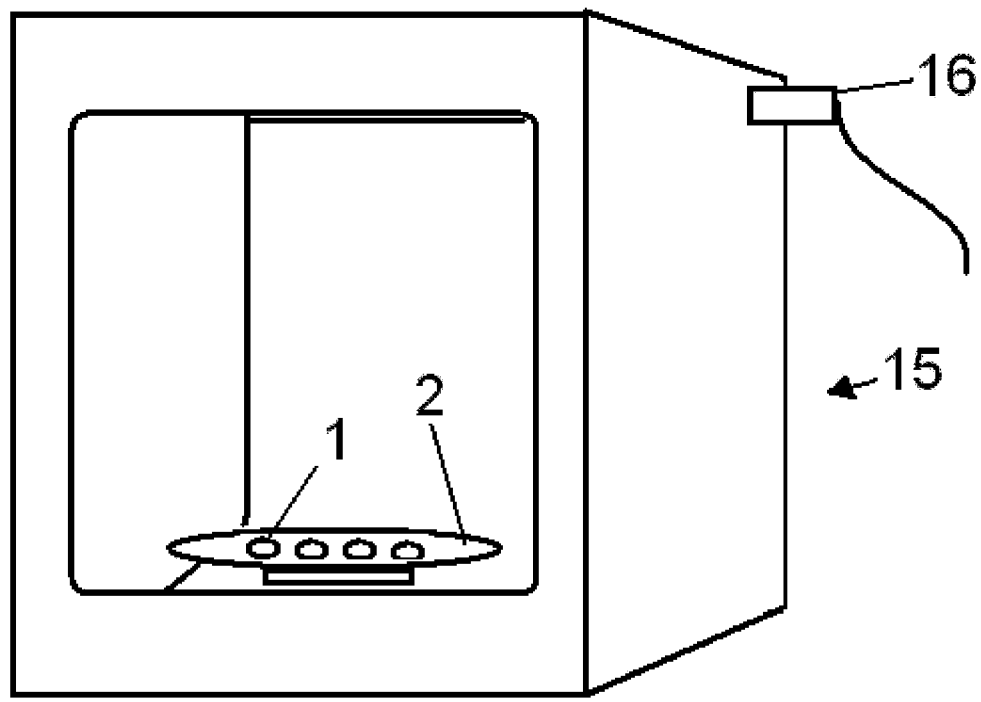
FIG. 6 is a perspective view of a sintering device for performing the method according to one embodiment of the present disclosure.

The method involves providing a sintering device 15, FIG. 6. The sintering device 15 is generally a sintering furnace. The sintering device 15 has generally an ability to provide heating and a controlled atmosphere, as is known to those skilled in the art. However, the sintering device should in addition preferably be able to provide a vacuum. The sintering device 15 is provided with, for example, couplings 16 for providing a connection to a non-disclosed vacuum pump.

The method involves providing a sintering method using the sintering device 15. The sintering method is in general provided by applying the body 1 to be sintered in the sintering device 15. A process temperature T as a function of process time t is schematically disclosed in FIG. 7. A heating time range A and a cooling time range B is provided. During the heating time range the temperature T in the sintering device 15 is raised to a top level $T_S$. The top level is generally named the sintering temperature $T_S$, see FIG. 7. The temperature T in the sintering device generally begins at ambient temperature, generally room temperature, and is raised to the top level $T_S$. In general, the raise to $T_S$ is finished after approximately half the full sintering process time t. In its simplest form the temperature T in the sintering device is raised following an essentially straight line with a constant ratio of raising the temperature a constant number of degrees per time unit, as exemplified in FIG. 7.

The sintering temperature $T_S$ is chosen depending on several parameters known to one skilled in the art. Parameters having an effect on choice of sintering temperatures $T_S$ include, the composition of the binder metal, the desired grain size of the sintered product as well as the desired porosity of the sintered product. A higher sintering temperature $T_S$ give growth of grains. A typical value for $T_S$ is 1500° C. Other values are also possible such as $T_S$ of 1400° C.-1500° C. With a binder metal comprising cobalt or cobalt and nickel, a sintering temperature preferred $T_S$ value is 1430° C.-1480° C.

Figure 7:
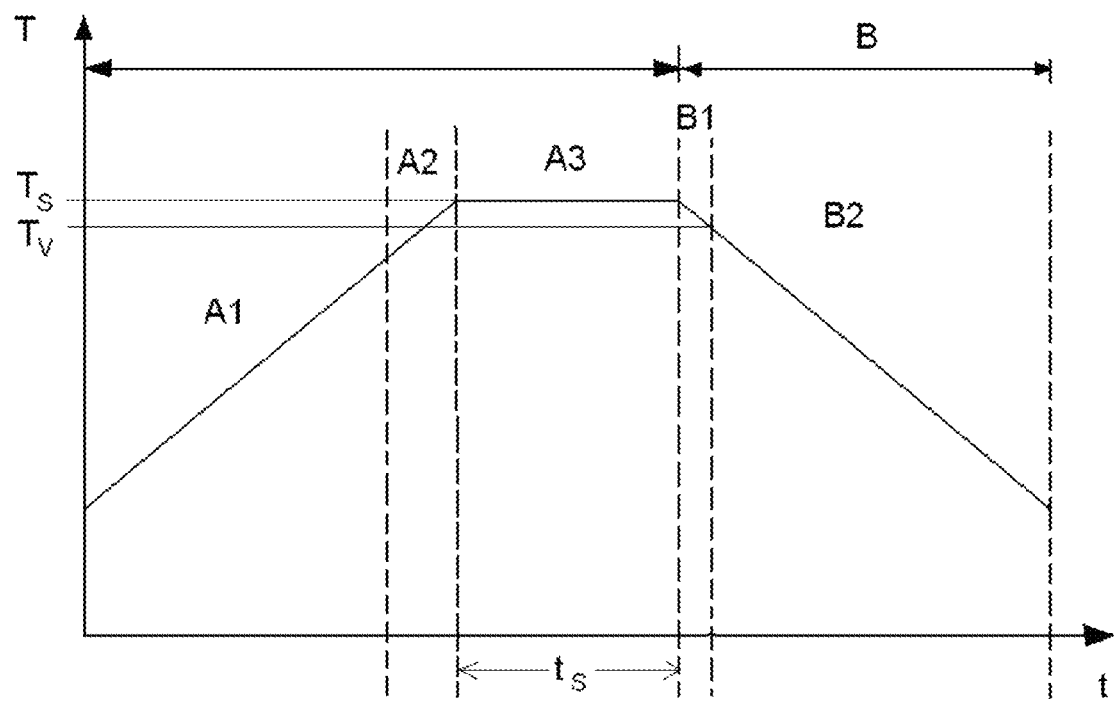
FIG. 7 is a graph of temperature as a function of time for one embodiment of the method according to the present disclosure.

In FIG. 7 the heating time range A is divided into three time subranges A1, A2 and A3. A3 discloses the holding time $t_s$ at the sintering temperature $T_S$. In time range A1 the temperature can, for example, be raised at a different temperature/time ratio than in the time range A2 than what is disclosed in FIG. 7 as in for example any of FIGS. 8-9.

After the heating time, range A follows a cooling time range B. According to the method of the present disclosure, the cooling time range B is divided into at least two time ranges B1 and B2, wherein the pressure during B1 is 100-15000 Pa, preferably 500-1500 Pa, and that during B2 the partial pressure of cobalt differs at different sides or parts of sides of the body. The principal idea is to lower the pressure in the chamber during the time range B2 of the cooling time range B. One pressure given by way of example in the application, the defined term vacuum is less than 100 Pa. It is also possible to perform the method, for example, in the range 0.01 Pa-70 Pa, or preferably in the range of 0.1 Pa-50 Pa. Vacuum is to be understood as would be defined by one having ordinary skill in the art. The vacuum can, for example, be a dynamic vacuum, i.e., a continuous pumping of gas from the sintering device.

During the time range B1, the cooling conditions are set to provide a binder metal capping layer on the whole surface of the cermet or cemented carbide body. This is achieved by the decarburizing conditions and the pressure in the sintering device (the furnace). Thereafter, during the time range B2, the cooling conditions are set to provide an evaporation of the recently formed binder metal capping layer on part of the surface (side or part of a side) of the body, while the binder metal on other parts of the surface (other part of side or other sides) of the body is not evaporated. The evaporation is provided by a partial pressure of binder metal that differs on different sides or parts of sides or parts of surfaces of the body. If the partial pressure of binder metal is low, binder metal evaporates. The time needed to evaporate all the layer depends on the thickness of the layer, the temperature levels (cooling rate) and the pressure and are to be optimized by the skilled person.

The temperature decrease during time range B can be altered such that the cooling at first is at a higher cooling rate and, for example, at a point of transfer from time range B1 to time range B2 the cooling is slowed down to a lower cooling rate. During B1 the temperature drop could be 5° C./min, or 1-5° C./min. During B2 a drop of 1° C./min, or 1-5° C./min, is generally applicable. In one embodiment the temperature is held constant during B2 or during a part of B2. The time during which the binder metal actually evaporates from a surface of the body can be adapted and adjusted by a person skilled in the art, for example, based on the specific sintering furnace, sintering tray, binder metal composition and charge load. The time of evaporation needs to be sufficient to form a side of the body with no binder metal capping.

During the holding time $t_S$ the atmosphere is preferably a mixture of $CO/N_2/Ar$. During a time range B1 of the cooling time range B the atmosphere preferably comprises Ar and CO atmosphere. During the time range B2 of cooling time range B, the atmosphere preferably comprises Ar.

Figure 8:
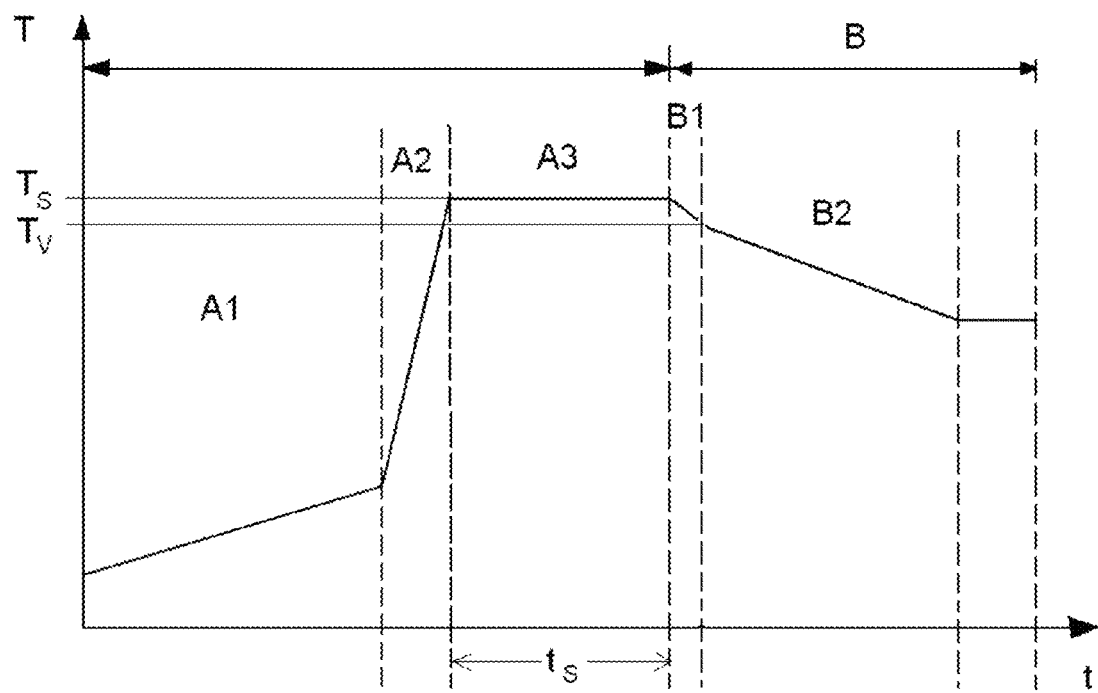
FIG. 8 is a graph of temperature as a function of time for one embodiment of the method according to the present disclosure.
Figure 9:
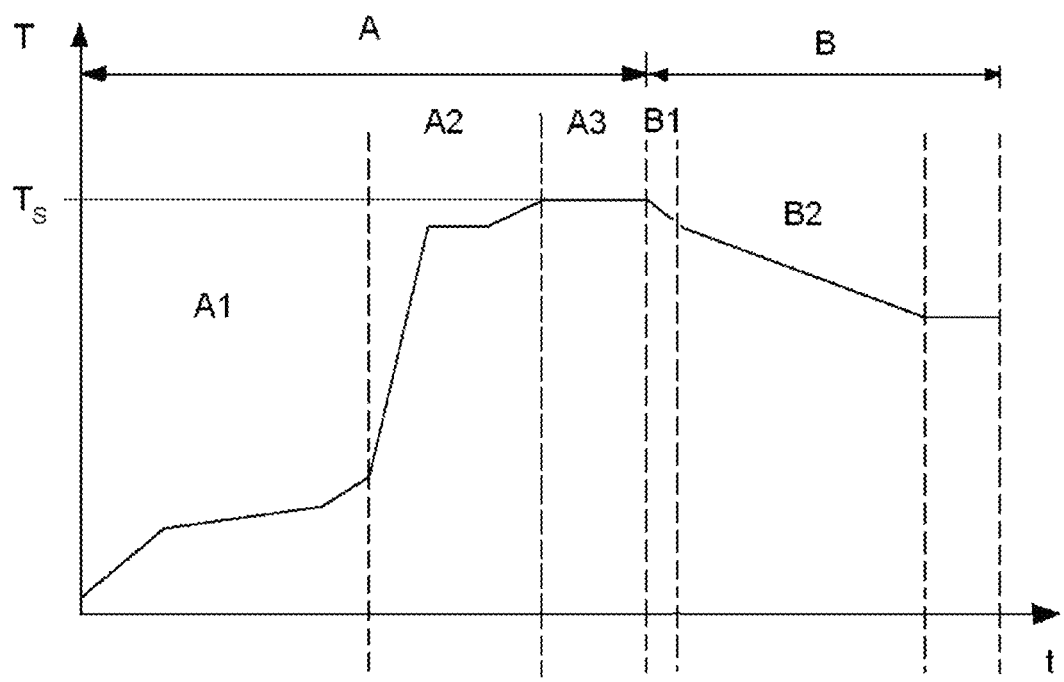
FIG. 9 is a graph of temperature as a function of time for one embodiment of the method according to the present disclosure.

In FIG. 8, the temperature ratio of temperature range A1 is raised at a middle section of A1 with a ratio that is smaller than in the beginning and the end of temperature range A1.

The method involves reducing the partial pressure for binder metal during cooling time range B, at least in time range B2, on at least one side of the body undergoing sintering, and at the same time providing for a relatively higher partial pressure of binder metal, on at least one other side of the body undergoing sintering. The reduction of partial pressure of binder metal has the effect that the content of binder metal of a surface layer becomes low or non-existing compared to other sides provided with a higher partial pressure of binder metal. The low partial pressure of binder metal will in turn have the result that binder metal is evaporated from the surface of the body 1 undergoing the sintering process according to the method. And at the same time the higher partial pressure of binder metal will have the effect that binder metal is preserved on the surface of the same sintered body 1. Thus, the method provides a sintered body 1 having at least one surface with binder metal capping and at least one surface without binder metal capping.

Figure 1:
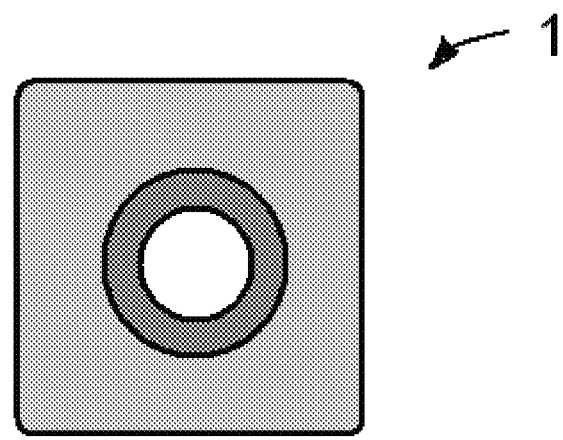
FIG. 1 illustrates a sintered body produced according to one embodiment of the method of the present disclosure.
Figure 2:
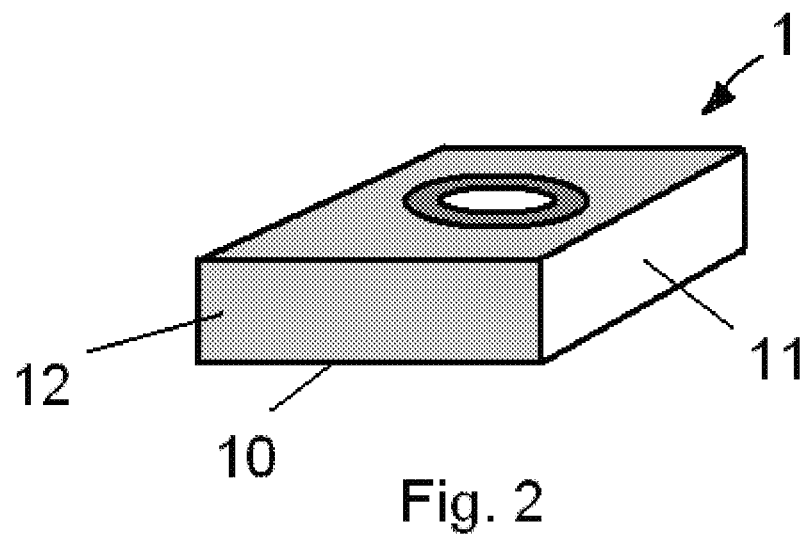
FIG. 2 is a perspective view of a sintered body produced according to another embodiment of the method of the present disclosure.
Figure 3:
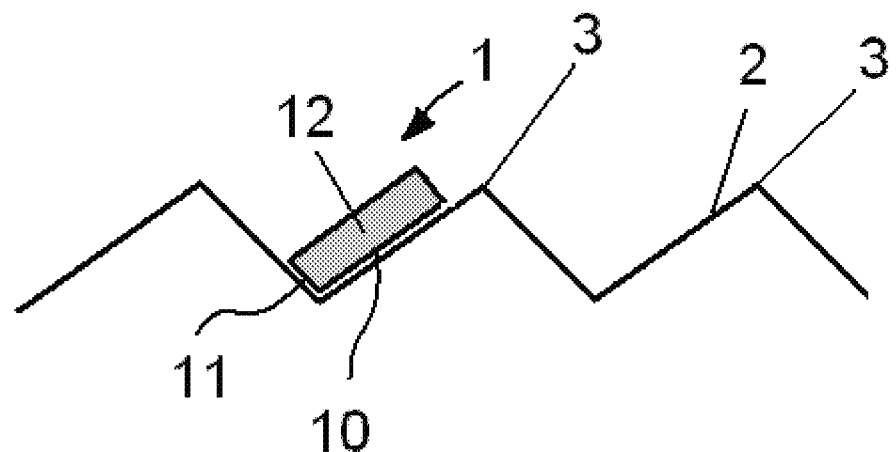
FIG. 3 a sintered body on a tray according to one embodiment of the present disclosure.

One way of controlling the partial pressure of binder metal is to let a side 10, 11, as shown in FIGS. 2 and 3, of a sintering body 1 to be in contact with a sintering tray 2, thus increasing the partial pressure for binder metal, and at the same time, apply vacuum to decrease the partial pressure of binder metal for other sides 12 of the sintering body 1 not in contact with the sintering tray 2. The small distance between the tray and body is important for the effect, and the time of evaporation of binder metal needs to be optimized by the person skilled in the art.

Figure 4:
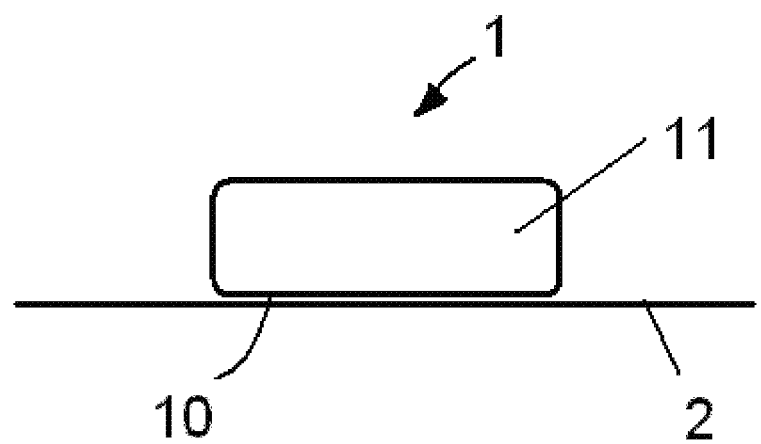
FIG. 4 illustrates a sintered body on a tray according to another embodiment of the present disclosure.
Figure 5:
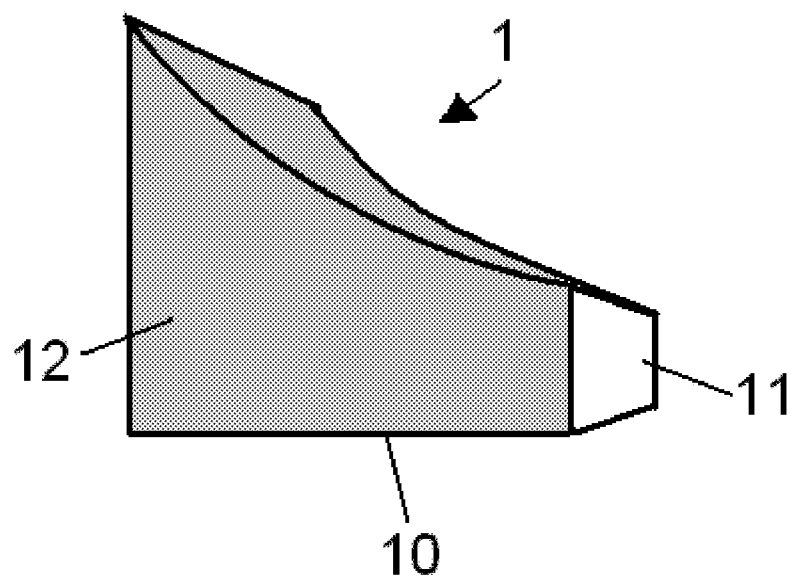
FIG. 5 illustrates an alternative sintered body produced according to one embodiment of the method of the present disclosure.

In order to perform this, a particular sintering tray 2 can be used, that has an increased surface area, see FIG. 3. The increased surface area of the sintering tray 2 is achieved by providing ridges 3 on the tray 2. Thus, at least two sides 10, 11 of the body to be sintered can be in contact with the tray 2 simultaneously. As should be understood, the geometrical shape of the tray is of essential importance in order to preserve the high partial pressure for binder metal on sides of the body. The distance between the surface of the tray and the surface of the body needs to be small enough to preserve a partial pressure of binder metal that is higher as compared to the partial pressure of binder metal at other surfaces of the body. In the simplest form, the tray 2 is provided in a form as shown in FIG. 4, where it has a generally flat shape. In addition to the shape as disclosed in FIG. 3, it should be appreciated that tray 2 can be of any desired shape, from a simple flat tray 2 as in FIG. 4, a shape as shown in FIG. 5 and any other shape.

Furthermore, the loading of the body on the tray may comprise shields or protruding parts. Shields can be used to form binder metal capping on for example opposite sides of the body, such as on the top and on the bottom thereof. Protruding parts on the tray can be used to form selected areas of binder metal capping on the body. The loading of the bodies on the tray should not be too close or tight, since a problem with for example one body acting as a shield for another body may arise. This optimisation can be performed by one having ordinary skill in the art.

The surface layer of a body according to the present disclosure is to be understood as an outermost layer of a body. The surface layer of a sintered body should be understood as extending not over but including 0.15 mm from the outermost surface and into the sintered body. The binder metal capping layer is preferably 1-20 μm, more preferably 1-6 μm thick.

In a further explanation of the method, it should be understood that typically the binder metal is concentrated at the surface of the sintered body, i.e. the binder metal capping occurs, in a narrow range of cooling temperatures T during cooling time range B. The range should in general be understood as the time range B1 or at least part of the disclosed time range B1 of FIGS. 6-8. The atmosphere as mentioned comprises at least one inert gas, for example argon, and preferably further constituents chosen from the group of CO and $N_2$. The temperature range for T where binder-metal-capping is achieved during cooling, in case of binder metal comprising cobalt or cobalt and nickel, is in general 1411° C.-1365° C. or more preferably 1411° C.-1387° C. During the temperature range where binder-metal-capping is achieved, vacuum should not be applied.

In order to achieve binder metal capping, carbon has to be present in the body and decarburizing conditions has to be provided outside the body. One way to explain binder metal capping is that the binder metal will solidify inside the body first, and liquid phase of binder metal will then be forced to the outer surface, forming an outer layer of binder metal. The carbon present in the body can for example be carbon black, WC or carbides of Ti or Ta or in any other suitable phase.

The mentioned conditions results in binder metal-capping, for example, cobalt capping. Binder metal-capping means in this context, that the body to be sintered initially has an essentially homogenous matrix with regard to distribution of cobalt inside the matrix, and that it, after binder metal capping has occurred, has transformed into a body wherein the binder metal distribution within the matrix is still essentially homogeneous, but where a binder phase layer has been formed as an outermost surface layer. Binder metal capping of a surface area means that the surface area is essentially covered with binder metal, an outermost layer of binder metal is present, also called a binder metal capping layer.

Figure 10:
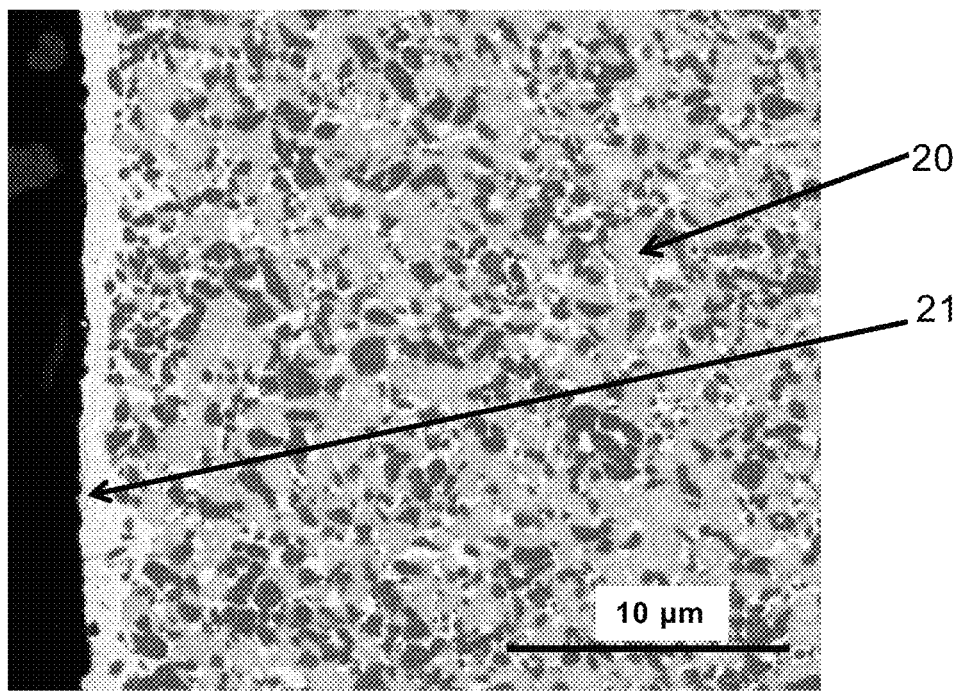
FIG. 10 is an SEM picture of a polished cross section of the insert treated in Example 4 wherein the shown outer surface comprises a Co capping layer 21.
Figure 11:
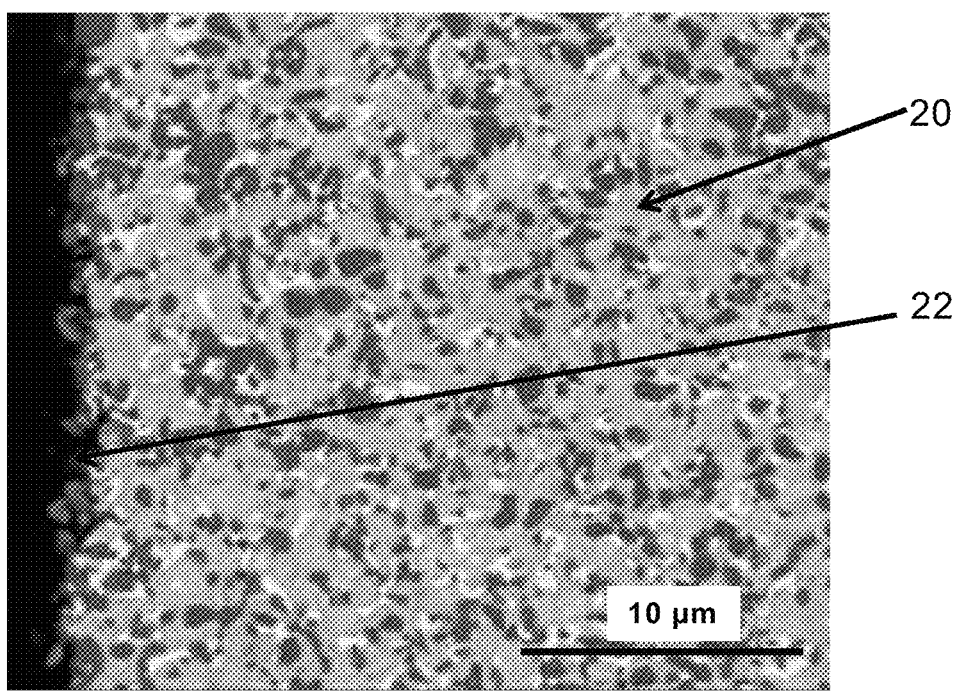
FIG. 11 is an SEM picture of a polished cross section of the insert treated in Example 4 wherein the shown outer surface 22 comprises no Co capping layer.

The binder metal capping layer can be identified as a metallic or shiny surface as studied with a naked eye, which is the case if the binder metal is, for example, cobalt or nickel or a combination thereof. The binder metal capping layer is typically bright in light microscope view as compared to the surface of a cermet or cemented carbide body. Cross sections studied in an SEM, as shown in FIGS. 10 and 11, clearly indicates the presence or absence of a binder metal capping layer. A surface or side or part of a side that is essentially free of binder metal is defined as a surface or side or part of a side where no binder metal capping layer is formed. This surface or side or part of a side is relatively dark in a light microscope view, and no outermost layer of binder metal is visible in a cross section study.

With regard to the produced sintered body 1 the preferred product is a cermet or a cemented carbide. Common for all cermet and cemented carbide inserts are that they are typically produced by powder metallurgical methods: milling powders of the hard constituents and binder metal, pressing to from bodies of desired shape and finally, sintering the pressed bodies. During the sintering, the bodies are heated typically above the eutectic temperature of the binder metal composition to form a liquid binder phase. The cermet or cemented carbide green body consolidates during the sintering process, and thereby porosity is eliminated, shrinkage is promoted and final density is reached.

EXAMPLES

A cermet powder mixture was manufactured from: 18 wt % Co, 10 wt % Nb, 4 wt % Ti, 6 wt % N and balance WC. The powder mixture was wet milled, dried and pressed into inserts of the type SNMA 120412. Four experiments were performed using processes as schematically showed in FIG. 7. A sintering device connected to a pump arranged for holding a dynamic vacuum was used. In Examples 1-3 the pressure conditions were evaluated while one surface of the insert was in contact with the tray. In Example 4 the tray was adapted to support the insert on two sides.

Example 1

The insert was placed on a flat tray whereby only the bottom surface of the insert was in contact with the tray. Sintering was performed at a pressure of 1300 Pa by first applying a heating and then holding $T_S$ 1450° C. for 60 minutes in a gas mixture of Ar, CO and $N_2$, and thereafter a cooling in Ar atmosphere down to room temperature. A continuous shiny binder phase layer was obtained on all visible surfaces of the insert.

Example 2

An insert was sintered under the similar conditions as for Example 1: heating up to $T_S$ 1450° C. and then holding this temperature for 60 minutes and thereafter cooling. But in this experiment a gas mixture of Ar, CO and $N_2$ at 1300 Pa was used during the first 45 minutes of the holding time, thereafter a vacuum (about 2 Pa) was introduced and maintained during the cooling down to room temperature. This resulted in that no Co-capping was obtained on any visible surface of the insert and further sever porosity was obtained as well.

Example 3

An insert was sintered under similar conditions as in Example 1: heating up to $T_S$ 1450° C. and then holding this temperature for 60 minutes and thereafter cooling, but in this experiment sintering atmosphere (a gas mixture of Ar, CO and $N_2$ at 1300 Pa) were maintained until the cooling had reached 1370° C., were a vacuum of 50 Pa was introduced. Theses vacuum conditions were kept during the rest of the cooling. When observing the insert after sintering, only at the bottom side, the side that has been in contact with the tray during cooling had a shiny layer of Co capping while no Co-capping could be observed on the other surfaces of the insert.

Example 4

An insert was sintered under the same conditions as in Example 3, but this time a tray as disclosed in FIG. 3 was used, whereby the insert was in contact with the tray on two of its sides. After sintering, the two sides that had been in contact with the tray showed Co-capping, while the other surfaces did not show any Co-capping. A cross section of one surface with Co-capping is shown in FIG. 10. The average thickness of the Co capping layer is 2 μm. The Co-capping layer is shown as a light and continuous layer 21 and the cross section of the cermet body 20 shows the slightly darker hard constituents of carbides and nitrides. A cross section of one surface 22 with no Co-capping is shown in FIG. 11.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A method of producing a sintered cutting body comprising the steps of:
   providing a body of cermet or cemented carbide comprising carbon and binder metal;
   providing a sintering device for sintering the body;
   sintering the body in a sintering process by means of the sintering device;
   providing the sintering process with a time range, the time range being a heating time range where temperature at a certain moment in time is either constant or rising;
   providing a subsequent cooling time range of the sintering process where a cooling temperature in the cooling time range is arranged at a certain moment in time to be constant or decreasing; and
   providing an atmosphere comprising at least one inert gas at a pressure, at least during a first part time range of the cooling time range in order to provide decarburizing conditions, wherein a pressure in the sintering device during the first part time range fulfills the condition 100 Pa≤P≤15000 Pa, wherein at least during a second part time range, subsequent to the first part time range, a partial pressure of the binder metal is maintained higher for a side or part of a side of the body and wherein the other part of the side or other sides of the body has/have a lower partial pressure of the binder metal, such that the binder metal is evaporated, thus providing a side or part of a side with binder metal capping, and other part of a side or other sides with essentially no binder metal capping.

2. The method according to claim 1, wherein the higher partial pressure for the binder metal is achieved by contacting the side or the part of the side of the body, with a tray, thus achieving a sintered body provided with a side or part of a side comprising a surface layer of the binder metal, wherein the other sides or part of the side of the body that have not been in contact with a tray are subjected to the low partial pressure of the binder metal and thus are essentially free of binder metal capping.

3. The method in accordance with claim 2, wherein the tray is provided with ridges such that when a body rests on the tray, two sides of the body are in contact with the surface of the tray.

4. The method according to claim 1, wherein at least two sides of the body are provided with binder metal capping while the other sides are essentially not.

5. The method in accordance with claim 1, wherein the partial pressures of binder metal during the second part time range is achieved by decreasing the pressure in the sintering device to a value below the pressure during the first part time range.

6. The method in accordance with claim 1, wherein during the second part time range the pressure fulfills the condition 0.01 Pa≤P≤70 Pa.

7. The method in accordance with claim 1, wherein the second part time range is started when the temperature has decreased below a solidification temperature of the binder metal.

8. The method in accordance with claim 7, wherein the second part time range is started when the temperature has decreased about 10 degrees below the solidification temperature of the binder metal.

9. The method in accordance with claim 1, wherein the binder metal comprises cobalt.

10. The method in accordance with claim 1, wherein the inert gas is argon during the first part time range.

11. The method in accordance with claim 1, wherein the atmosphere comprises argon and one or both of carbon monoxide and nitrogen during the first part time range.

12. The method according to claim 1, wherein the sintering temperature is in the range 1400° C.≤TS≤1500° C.

13. The method according to claim 1, wherein the thickness of the binder metal capping layer is 1-20 μm.

14. The method according to claim 1, wherein the sintering temperature is in the range 1430°≤TS≤1480° C.

15. A sintered cutting body produced according to the method of claim 1.

* * * * *